(12) United States Patent
Melymuk et al.

(10) Patent No.: US 9,039,328 B2
(45) Date of Patent: May 26, 2015

(54) PIPE FLOAT

(71) Applicant: Snyder Industries, Inc., Lincoln, NE (US)

(72) Inventors: Michael C. Melymuk, Pittsburgh, PA (US); William Jay Skinner, Westfield, IN (US); Nicholas L. Eitzmann, Lincoln, NE (US)

(73) Assignee: Security Paks International, LLC, Indianapolis, IN (US)

( * ) Notice: Subject to any disclaimer, the term of this patent is extended or adjusted under 35 U.S.C. 154(b) by 0 days.

(21) Appl. No.: 13/783,152

(22) Filed: Mar. 1, 2013

(65) Prior Publication Data

US 2013/0251457 A1 Sep. 26, 2013

Related U.S. Application Data

(60) Provisional application No. 61/615,116, filed on Mar. 23, 2012.

(51) Int. Cl.
*F16L 1/12* (2006.01)
*F16L 1/24* (2006.01)

(52) U.S. Cl.
CPC .................... *F16L 1/24* (2013.01)

(58) Field of Classification Search
CPC ..................... F16L 1/20; F16L 1/24
USPC ........................................ 405/171
See application file for complete search history.

(56) References Cited

U.S. PATENT DOCUMENTS

| 3,594,835 | A  | * | 7/1971  | Wilson       | 441/133 |
|-----------|----|---|---------|--------------|---------|
| 5,575,590 | A  | * | 11/1996 | Drost et al. | 405/166 |
| 7,328,747 | B2 | * | 2/2008  | Jones et al. | 166/367 |
| 8,152,581 | B2 | * | 4/2012  | Kato         | 441/133 |
| 8,443,896 | B2 | * | 5/2013  | Howard et al.| 166/345 |
| 8,500,502 | B2 | * | 8/2013  | Benedetti    | 441/133 |

FOREIGN PATENT DOCUMENTS

WO WO 2009103498 A1 * 8/2009

* cited by examiner

*Primary Examiner* — Thomas B Will
*Assistant Examiner* — Katherine Chu
(74) *Attorney, Agent, or Firm* — Hovey Williams LLP

(57) ABSTRACT

A pipe float is configured for receiving a pipe therein and providing buoyancy for maintaining the pipe along the surface of a body of water. The pipe float has an inner surface presenting a central passage adapted for receiving the pipe, the inner surface including a plurality of preferably substantially planar, longitudinally extending panels which provide a continuous inner surface. Adjacent panels are angularly oriented relative to one another, and the pipe float is preferably provided as a plurality of pipe float sections assembled together whereby one panel of a pipe float section is preferably oriented at an obtuse angle to an adjacent panel of that pipe float section. The panels may be of different transverse dimensions whereby the passage has a greater transverse dimension G which is substantially greater than a smaller transverse dimension S, with the outer diameter D of the pipe received in the passage being of a value equal to or smaller than G and greater than or equal to S.

5 Claims, 5 Drawing Sheets

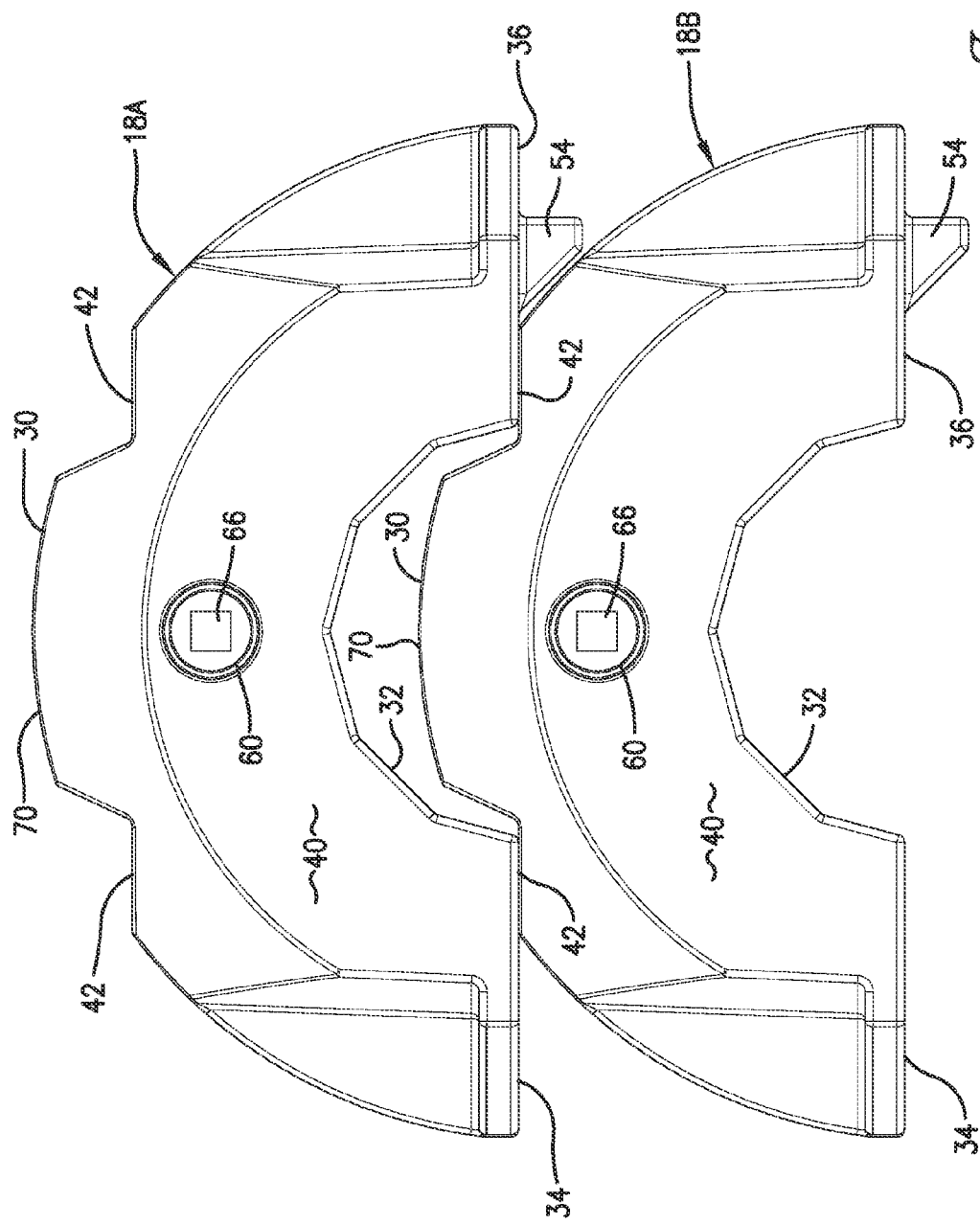

PIPE FLOAT

This application claims the benefit of U.S. Provisional Patent Application No. 61/615,116 filed Mar. 23, 2012, the entire disclosure of which is incorporated herein by reference.

BACKGROUND OF THE INVENTION

1. Field of the Invention

The present invention concerns a pipe float adapted for attachment to a pipe or other enlongated members to provide buoyancy and maintain the portion of the pipe to which the float is attached at the surface of a body of water. The pipe float hereof is preferably configured with an internal surface having a plurality of planar faces to provide improved engagement with a typically cylindrical surface, and retention of the float on the pipe.

2. Description of the Prior Art

Pipe floats are articles which are attached to the outer surfaces of members to maintain buoyancy. Members with curved surfaces, for example elongated substantially cylindrical surfaces, present challenges in terms of successfully engaging and holding the surfaces over extended periods of use. Such elongated members having arcuate (typically cylindrical) surfaces will for convenience herein, be identified as "pipes", which, except where indicated, are intended to include non-tubular members having arcuate surfaces. Such pipes are often flexible and have a variety of uses, such as barriers or as tubular conduits. For example, a pipe may be used to inhibit migration of oil along the surface of a body of water, or as a pipe for conveying liquids where it is desired that the pipe be positioned at the surface of a body of water for observation and/or to maintain the material conveyed in the pipe at the surface prior to discharge of the conveyed material on shore or to a vessel.

One typical use of pipe floats is in dredging operations where a dredge is used to remove sediment from a body of water and discharge it to another vessel such as a barge or to the shore for drying and removal. In such operations, water carries the sediment from the dredge to the shore or to the vessel through a pipe. The pipe may have neutral or somewhat negative buoyancy, and thus pipe floats are attached to the pipe at locations along its length to keep the pipe at or near the surface of the body of water. Heretofore, such pipe floats have been constructed with a rounded inner surface which, as would be expected, is sized and configured to be circular in vertical section and thus the same as the outer surface of the pipe.

SUMMARY OF THE INVENTION

The present invention concerns a new pipe float which, contrary to conventional thinking, is provided with an inner surface which is not configured with an inner surface which is circular to match the outer surface of a pipe to be received therein. Rather, the pipe float hereof has an inner surface which has a non-circular inner surface so as to provide a plurality of lines of positive engagement with the pipe. This configuration is intended to provide improved engagement with the pipe and to thereby inhibit relative movement of the pipe float relative to the pipe. Such movement might be caused over time by the action of wind, waves, or the wakes of vessels. By this improved configuration, it is intended to inhibit longitudinal movement of the pipe float along the pipe, which might cause the pipe floats to lose their longitudinal spacing with the result that a portion of the pipe sinks. It is also intended to inhibit rotational movement of the pipe float about the pipe, which may result in wear on the pipe and/or a decrease in engagement between the pipe and the pipe float.

The pipe float hereof is preferably configured in a plurality of separable pipe float sections configured complemental to one another for attachment with a pipe therebetween. The assembled pipe float is configured with a central passage through which the pipe float may pass. Each pipe float section thus has an outer surface, typically exposed to the environment, and an inner surface for engaging the pipe. A shell, which includes the outer surface and inner surface, encloses a buoyancy chamber which is preferably hollow. The inner surfaces are configured to present a plurality of engagement lines which are preferably tangential to an arcuate surface of the pipe when the pipe float sections are assembled. More preferably, the inner surfaces are polygonal in shape, presenting a plurality of flat surfaces. Most preferably, the inner surfaces are configured with a width and a height which are dissimilar, the inner surface thus presenting an irregular polygonal shape. Thus, the inner surfaces are designed to provide passages which accommodate a range of pipe diameters: for example, two assembled pipe float sections may provide a passage configured to engage with pipes ranging from 15 to 25 centimeters in diameter, while a different assembled pair of pipe float sections may provide a passage configured to engage with pipes of 25 to 35 cm in diameter. Most preferably, each of the pipe float sections is of identical configuration, whereby two pipe float sections of identical configuration can be assembled by bolting together or the like into a pipe float hereof. Furthermore, the each of the pipe float sections is configured to at least partially stack or nest with another such section, whereby transportation and storage requirements are reduced in that a greater number of commonly sized pipe float sections may be transported or stored in a given volume of space.

BRIEF DESCRIPTION OF THE DRAWINGS

FIG. 6 is an end elevational view of a plurality of pipe float sections in a stacked and partially nested orientation.

DESCRIPTION OF THE PREFERRED EMBODIMENT

Figure 1:
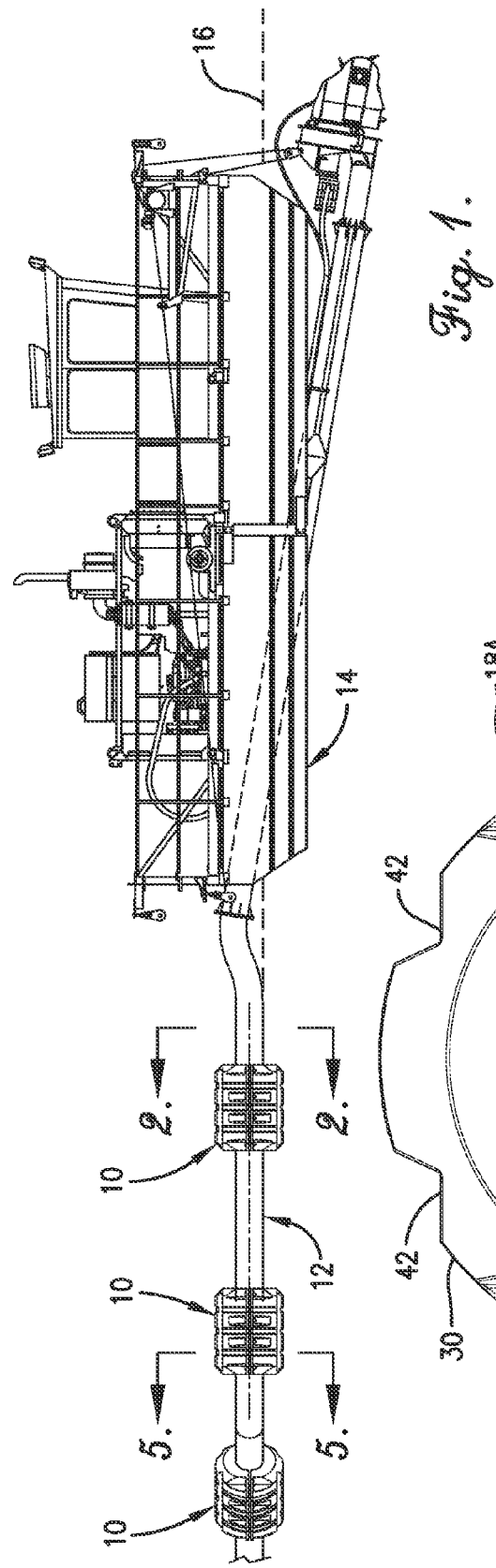
FIG. 1 is an elevational view of a plurality of pipe floats according to the present invention coupled in spaced relationship along a pipe for conveying material from a dredge.

Referring now to the drawings, FIG. 1 shows a plurality of pipe floats 10 in spaced relationship coupled to a pipe 12 which is connected to a dredge 14 floating on the surface 16 of a body of water. This is only one use the pipe floats 10 and is provided for purposes of illustration.

Figure 2:
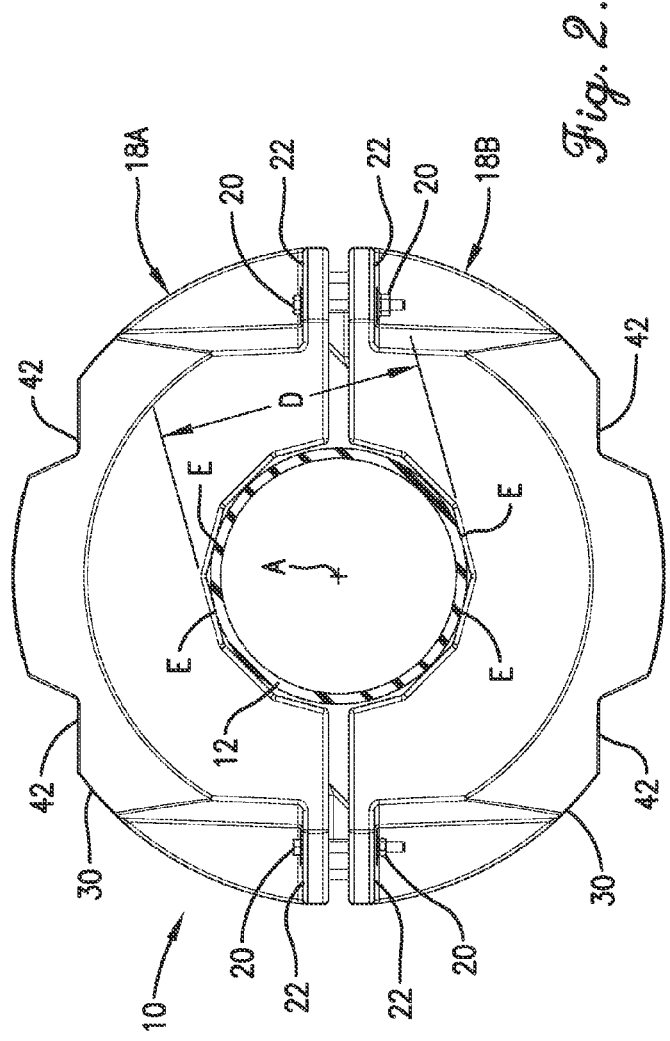
FIG. 2 is an end elevational view of a pipe float coupled to a tubular pipe, the pipe being shown in cross-section and taken along line 2-2 of FIG. 1, showing two pipe float sections coupled together, each pipe float section having an inner surface to thereby present, when assembled, a passage for coupling the pipe therein.
Figure 3:
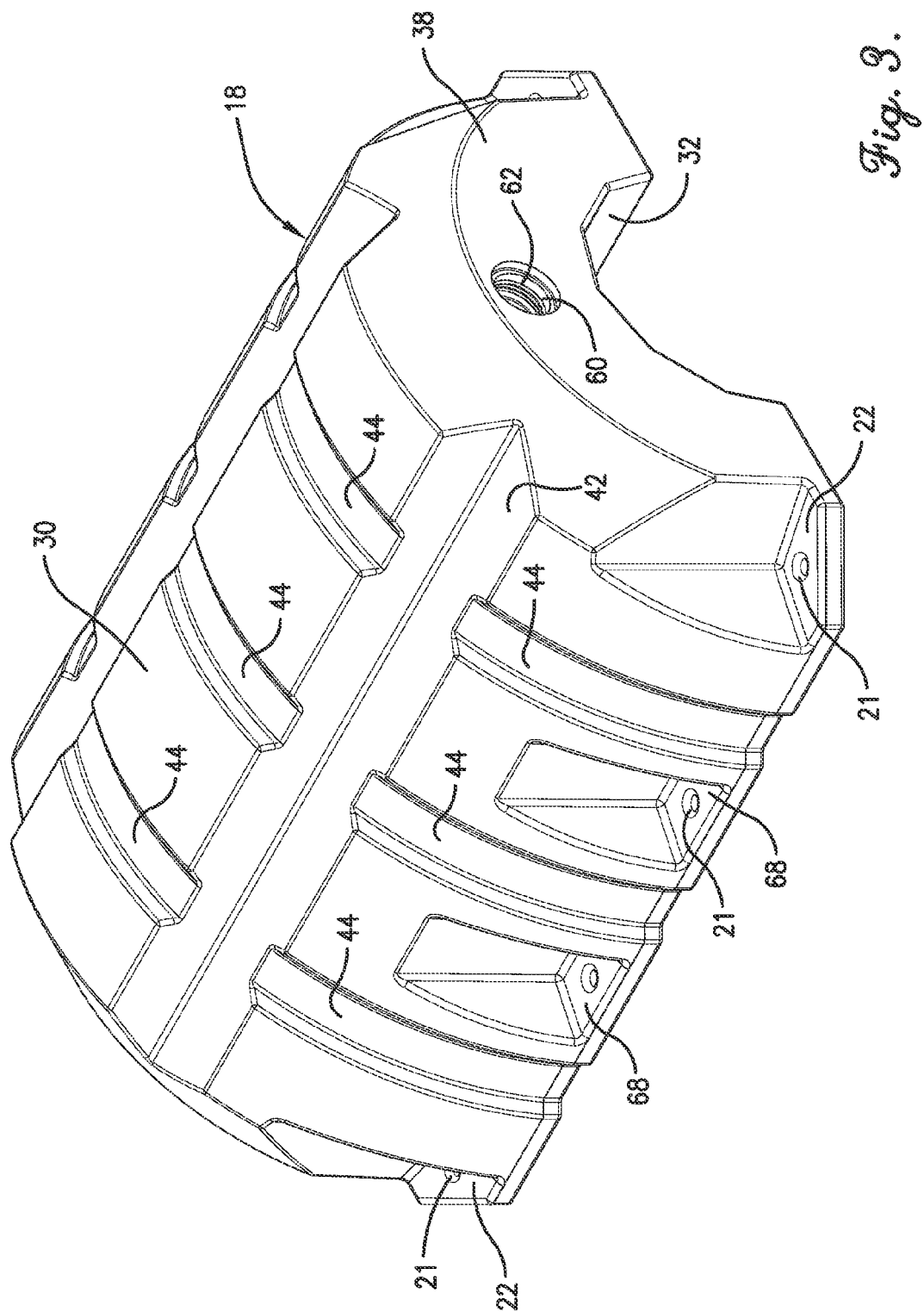
FIG. 3 is a top front perspective view of a pipe float section hereof, showing the outer surface, the flanges and one end wall.
Figure 4:
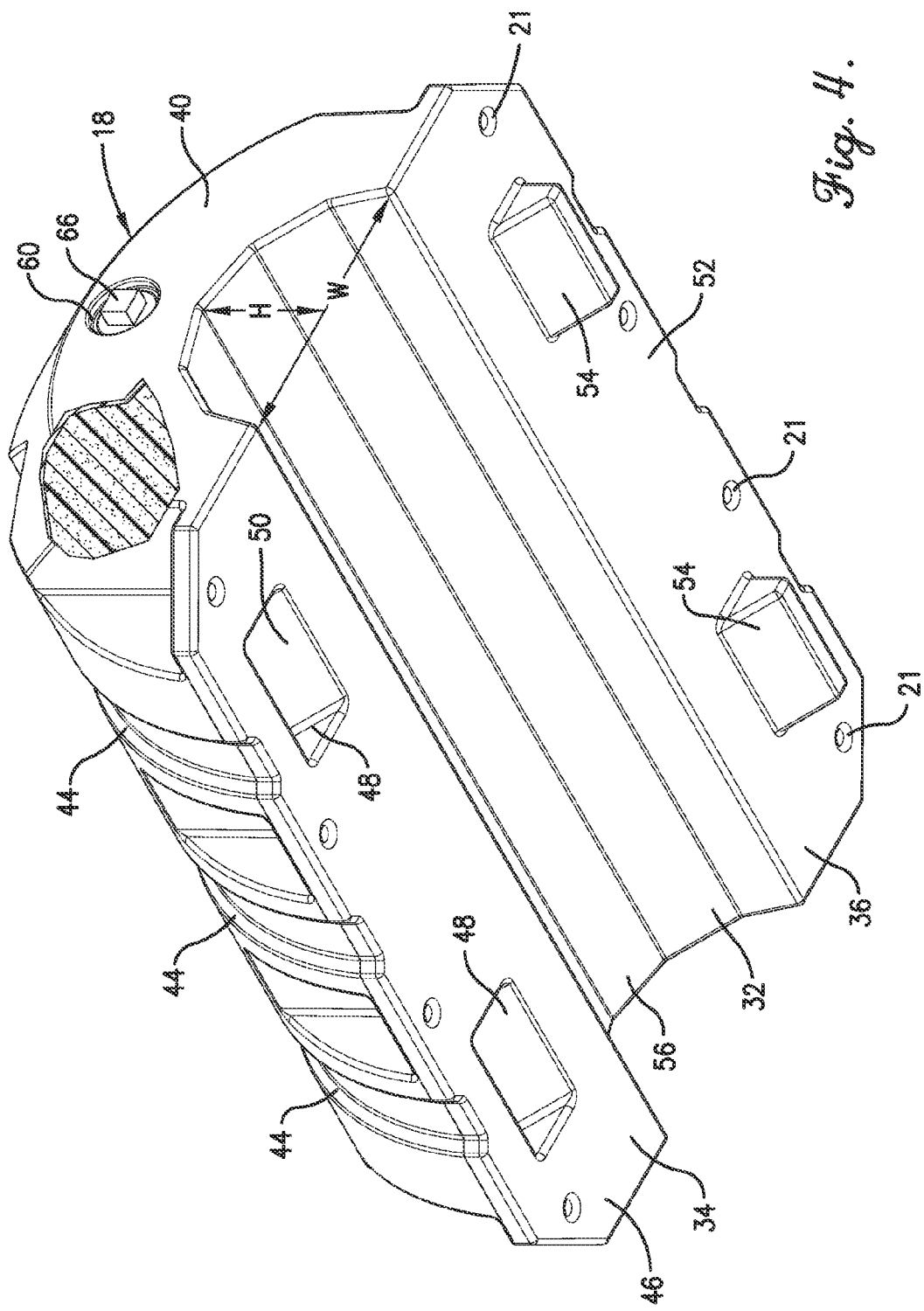
FIG. 4 is a bottom rear perspective view of a pipe float section hereof showing the inner surface, another end wall, and a first and a second mating surface, with a part of the another end wall broken away to show a buoyancy chamber having optional expanded synthetic resin foam flotation material.
Figure 5:
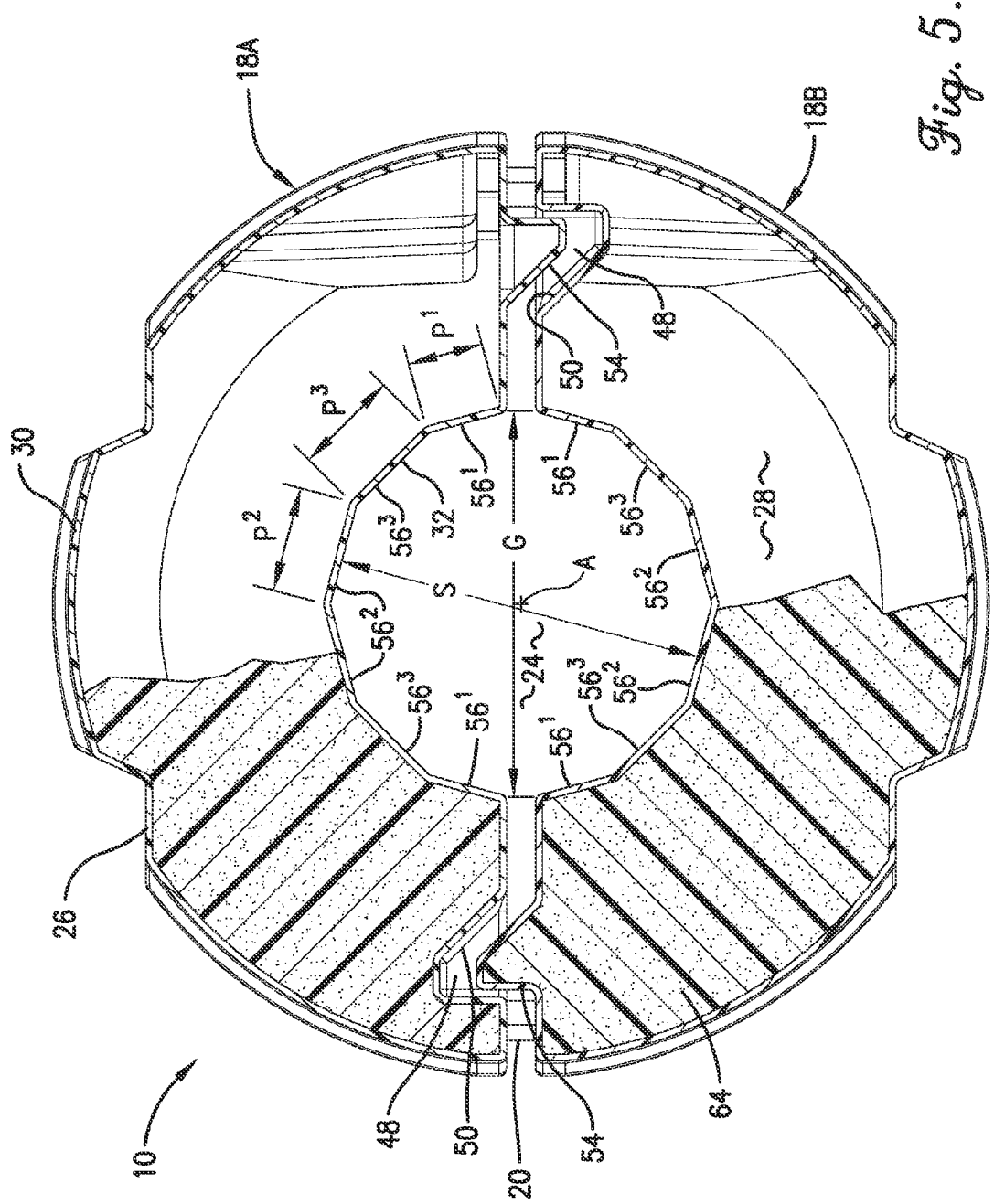
FIG. 5 is a vertical cross-sectional view taken along line 5-5 of FIG. 1 of an assembled pipe float showing the engagement between mating surfaces of opposed pipe float sections and with the pipe removed for clarity to show the different transverse dimensions of the panels making up the inner surface of the pipe float.

The pipe floats 10 are comprised of two pipe float sections 18, which in FIGS. 2, 5 and 6 are shown as pipe float sections 18A and 18B. In FIGS. 2 and 5, the pipe float sections 18A and 18B are, held together by threaded fasteners 20 such as nuts and bolts which pass through holes 21 in flanges 22 located at the corners of each pipe float section 18, whereas in FIG. 6 the pipe float sections are shown in a stacked and partially nested orientation for transport and storage. Advantageously, the pipe float sections 18A and 18B are identical in configuration and thus provide significant economies in manufacture and reduction of inventory while in transport or storage. When the pipe float sections 18A and 18B are coupled together as shown in FIGS. 2 and 5, they provide a central passage 24 through which the pipe 12 may be received. For purposes of clarity, a single pipe float section 18 is shown in FIGS. 3 and 4. The pipe float section 18 may be rotationally molded as a unitary structure of a synthetic resin material, such as high density polyethylene (HDPE) having a shell 26 which encloses a buoyancy chamber 28. The shell 26 includes flanges 22, an outer surface 30, an inner surface 32, a first mating surface 34, a second mating surface 36, and end walls 38 and 40. The outer surface 30 may have a generally arcuate configuration with a pair of longitudinally extending V-shaped grooves 42, and circumferentially extending channels 44. The V-shaped grooves may serve different functions, such as for supporting a line or cable, but one function is to serve as a stacking shelf as shown in FIG. 6.

As may be seen in FIG. 4, the first mating surface 34 may have a generally flat face 46 with a greater longitudinal than transverse dimension to accommodate therein at least one and preferably a plurality of longitudinally spaced recesses 48 which may have a greater longitudinal dimension than a transverse dimension. The recesses 48 have an inner recess wall 50 to prevent the entry of water into the buoyancy chamber 28. The second mating surface 36 is complementally configured with the first mating surface 34 and thus may have a generally flat side 52 having a greater longitudinal than transverse dimension and presents thereon at least one and preferably a plurality of ribs or lugs 54. The ribs or lugs 54 are longitudinally spaced and complementally configured and positioned on the second mating surface 36 with respect to the recess or recesses 48 whereby the ribs or lugs 54 are each configured for receipt within a respective recess 48 of another pipe float section 18 when face 46 of one pipe float section 18 is brought into engagement with side 52 of another pipe float section 18, as illustrated by the mating engagement of pipe float sections 18A and 18B of FIGS. 2 and 5.

The inner surface 32 is preferably provided with a plurality of panels 56 which together present a generally arcuate configuration comprised of chordal segments provided by the panels. Thus, the inner surface 32 preferably presents a polygon configuration when the pipe float 10 is assembled and viewed in elevation as seen in FIG. 2. The panels 56 may be of the same longitudinal dimension, i.e. length, but have different transverse dimensions or widths. For example, as illustrated in FIG. 5, panels $56^1$ positioned circumferentially most proximate the first mating surface 34 and second mating surface 36 have a substantially smaller transverse dimension $P^1$ than the transverse dimension $P^2$ of panels $56^2$ positioned circumferentially most remote from the first and second mating surfaces 34, 36. Panels $56^3$ which are positioned circumferentially intermediate panels $56^1$ and $56^2$ have a transverse dimension $P^3$ which is substantially greater than either dimension $P^1$ or $P^2$. As a result, each inner surface 32 may have a width W which is more than twice its height H, so that when the pipe float 10 is assembled, its longitudinally extending central passage 24 has a greater transverse dimension G which is greater than a smaller transverse dimension S between opposed panels $56^2$. As may be seen most clearly in FIGS. 2 and 5, the panels 56 form a continuous inner surface 32, with each adjacent panel positioned at an angle relative to the other, most preferably an obtuse angle, so that the passage 24 when viewed longitudinally presents a polygonal shape when viewed along a longitudinally extending axis A of the central passage. Thus the panels 56 defining the passage 24 of the assembled pipe float 10 form at least a triangularly configured passage when viewed in elevation or vertical cross-section as in FIGS. 2 and 5, more preferably a polygonal shape of at least 4 sides, and most preferably a polygonal shape of at least 6 sides. This arrangement of the panels 56, creates at least two longitudinally extending lines of engagement L on the inner surface 32 of each pipe float section 18 as the panels 56 are substantially tangential to the pipe 12. As a result, as illustrated in FIG. 2, there will be at least 4 lines of engagement E (as shown in FIG. 2) between the pipe float 10 and the pipe 12 which in this illustration is circular in cross-section provided that the pipe is within the range of design dimensions, i.e. the outside diameter D of the pipe is not wider than G nor smaller than S. Moreover, the longitudinally extending lines of engagement are internally spaced around the central passage 24 and thus circumferentially spaced around the pipe 12 therein to provide greater resistance to relative movement between the pipe 12 and the pipe float 10.

The end walls 38 and 40 may be provided with an indentation 60. The interior end of the indentation 60 may be left closed as initially molded so that the shell 26 has no openings into the chamber 28 and thus the chamber 28 is hollow. Alternatively, the interior end of the indentation 60 may be open, either as a function of the molding process or cut or knocked out after molding. In this way, the indentation 60 may have threaded walls 62 and serve as a socket whereby a nozzle may be inserted to introduce a buoyancy material 64 into the buoyancy chamber 28. For example, the buoyancy material may be a closed cell material. The buoyancy material might be provided by injecting a quantity of polyurethane into the buoyancy chamber 28 and allowing the buoyancy material to expand within the chamber 28. In any event, the buoyancy material will have a specific gravity of less than 1, and helps to maintain buoyancy of the pipe float 10 even should the shell 26 become cracked or broken to permit some water to enter. A plug 66 may be threaded into the socket to help prevent the entry of water through the indentation and into the buoyancy chamber.

When coupled to a pipe 12, the pipe float provides significant advantages over conventional pipe floats. Conventional pipe floats having a substantially circular passage when viewed in elevation may match only at two points, and over time may wear such that a looseness occurs so that only one point of connection may occur. Also, conventional pipe floats having such a circular shaped passage may not accommodate a range of pipe diameters, but require a match. In contrast, the present invention provides a minimum of four longitudinally extending lines of engagement between the pipe float 10 and the pipe 12. If wear should occur, and provided that the diameter of the pipe 12 is greater than S, the threaded fasteners 20 at the corner flanges 22 and also intermediate flanges 68 may be tightened to maintain contact by the panels 56 against the pipe 12. Advantageously, there remains sufficient area between the pipe 12 and the panels 56 so that a passage for water driven by wind or current may pass therethrough, thus reducing the tendency of the pipe float 10 to move longitudinally along the pipe 12.

By utilizing at least one, and preferably a plurality of ribs or lugs 54 and corresponding recesses 48, the pipe float sections readily fit together and the engagement therebetween helps to reduce transverse stress on the fasteners and portion of the shell surrounding the fasteners.

Another significant advantage presented by the present invention is the ability to stack pipe float sections 18 atop one another. As illustrated by FIG. 6, the pipe float sections 18 are configured whereby the first and second mating surfaces 34, 36 may rest on the grooves 42 in the shell 26 in a relatively stable condition. The uppermost portion 70 of the shell 26 (i.e., that portion between the grooves 42) is received into the area of the inner surface 32 defining the passage 24. The ribs or lugs 54 conveniently are positioned and configured so that they do not interfere with the resting of the mating surfaces on the grooves. By this configuration, a multiplicity of pipe float sections 18 may be stacked atop one another in a relatively stable stack notwithstanding the generally arcuate or even circular configuration of the outer surface of the shell.

Thus, the user may be able to reduce inventory by employing pipe floats 10 in accordance with the present invention which maintain good contact to resist movement relative to the pipe 12, and which accommodate a range of diameters of pipes, and which are readily stackable to reduce storage volume. Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of his invention as pertains to any apparatus not materially departing from but outside the literal scope of the invention as set out in the following claims.

We claim:

1. A pipe float comprising:
    a first shell having a first inner surface, a first outer surface, and a first mating surface, said first shell defining therein a buoyancy chamber, said first outer surface including a plurality of longitudinal grooves; and
    a second shell having a second inner surface, a second outer surface, and a second mating surface, said second shell defining therein a buoyancy chamber, said second outer surface including a plurality of longitudinal grooves configured to receive a complementary portion of said first shell, said complementary portion comprising a portion of said first inner surface and said first mating surface so that said first shell is nestably stackable on said second shell;
    wherein each inner surface includes a plurality of juxtaposed, longitudinally extending panels, each panel comprising a straight chordal segment with adjacent panels angularly oriented relative to one another so that said straight chordal segments of said inner surfaces form a central passage having a straight-edge polygonal shape when said first and second shells are connected and viewed along a longitudinally extending axis of said central passage, said first and second shells being connectable by adjustable fasteners for increasing or decreasing a size of said straight-edge polygonal shape so that different straight chordal segments contact the pipe depending on the size of the pipe.

2. A pipe float as set forth in claim 1, wherein adjacent panels have substantially different transverse dimensions whereby the width of the inner surface is greater than its length.

3. A pipe float section as set forth in claim 1, wherein said first and second shells are rotationally molded of synthetic resin.

4. A pipe float as set forth in claim 1, wherein said first mating surface includes
    a recess enclosed on all sides except an outer side, and wherein said second mating surface includes
    a rib extending outwardly from said second mating surface, said rib of said second mating surface being configured to be inserted into said recess of said first mating surface so as to prevent said first shell from translating longitudinally forwards and backwards and laterally left and right in relation to said second shell when said first and second shells are mutually oriented with said first mating surface proximate to said second mating surface.

5. A pipe float as set forth in claim 4, wherein said first shell further includes a third mating surface including a rib extending outwardly from said third mating surface, said second shell further including a fourth mating surface including a recess enclosed on all sides except an outer side, said rib of said third mating surface being configured to be inserted into said recess of said fourth mating surface.

\* \* \* \* \*